United States Patent [19]
Yamamoto et al.

[11] Patent Number: 5,973,997
[45] Date of Patent: Oct. 26, 1999

[54] FLASHER TYPE FISH SONAR

[75] Inventors: Tetsuya Yamamoto; Yoshio Shimauchi; Yoshikazu Muramatsu, all of Aichken, Japan

[73] Assignee: Honda Electronics Co., Ltd., Toyohashi, Japan

[21] Appl. No.: 09/178,289

[22] Filed: Oct. 23, 1998

[51] Int. Cl.$^6$ .................................................. G01S 15/96
[52] U.S. Cl. ........................................ 367/111; 367/109
[58] Field of Search .................................... 367/109, 111

[56] References Cited

U.S. PATENT DOCUMENTS 3,964,012  6/1976  Yamamoto et al. ................... 367/109
5,065,371  11/1991  Leavell et al. ......................... 367/111

Primary Examiner—Ian J. Lobo
Attorney, Agent, or Firm—Burgess, Ryan & Wayne

[57] ABSTRACT

An ultrasonic wave having a narrow directive angle and an ultrasonic wave having a wide directive angle are transmitted in water by two ultrasonic transducers, echo signals to the ultrasonic waves having the narrow and wide angles are displayed by the two luminous elements in unity in a flasher display, whereby the condition of fishes in the water can be seen widely.

2 Claims, 4 Drawing Sheets

FLASHER TYPE FISH SONAR

BACKGROUND OF THE INVENTION

The present invention relates to a flasher type fish sonar in which two ultrasonic waves having wide and narrow directive angles are transmitted in water and the echo signals of the two ultrasonic waves reflected in the water are received and flashed in the same portions of a flasher display by different colors.

Generally, in the fish sonar, when an ultrasonic transducer is put in the water and an ultrasonic pulse wave is transmitted from the ultrasonic transducer to the water, the ultrasonic pulse wave is propagated to the bottom of the water by conically spreading in an angle (a directive angle), one part of the echo ultrasonic pulse wave reflected by fishes and the residual echo ultrasonic pulse wave reflected by the bottom in the water are returned to the ultrasonic transducer and are converted to the electric signal in the ultrasonic transducer. Then, the time difference between the transmitting of the ultrasonic pulse wave and the receiving of the echo ultrasonic pulse wave is displayed as a distance information by a display means and we can see the fishes and the bottom in the water.

In such a fish sonar, when the transmitted ultrasonic pulse wave has one frequency (one directive angle), the distance between the water surface and the fishes in the directive angle of the ultrasonic pulse wave is detected by the position relation between the surface and the bottom in the water. However, the bottom and the fishes in the water, which are removed from the directive angle of the ultrasonic pulse wave, cannot be detected.

Also, there is proposed a fish sonar in which the two ultrasonic pulse waves having different frequencies and the wide and narrow directive angles are transmitted to the water by the ultrasonic transducers and the echo ultrasonic waves are received by the ultrasonic transducers and are displayed in the separate display portions of the display means. However, the fish positions must be decided by comparing the separated pictures with each other.

SUMMARY OF THE INVENTION

It is, therefore, the primary object of the present invention to provide a flasher type fish sonar in which ultrasonic pulse waves are transmitted from two ultrasonic transducers having different directive angles at water in the same time and echo ultrasonic pulse waves are received by the ultrasonic transducers and are displayed on the display face of a flasher display by different colors.

It is another object of the present invention to provide a flasher type fish sonar in which ultrasonic pulse waves are transmitted from two ultrasonic transducers having different directive angles in water in the same time and echo ultrasonic pulse waves are received by the ultrasonic transducers and are displayed on one picture area of a flasher display by rotating red and green luminous elements, whereby fishes below the ultrasonic transducers and peripheral fishes in the water are detected.

In order to accomplish the above and other objects, the present invention comprises a narrow directive ultrasonic transducer for generating ultrasonic pulse waves having a narrow directive angle, a wide directive ultrasonic transducer for generating ultrasonic pulse waves having a wide directive angle, a first oscillator for applying oscillating signals to the narrow directive ultrasonic transducer, a second oscillator for applying oscillating signals to the wide directive ultrasonic transducer, a first receiver for amplifying echo signals from the narrow directive ultrasonic transducer, a second receiver for amplifying echo signals from the wide directive ultrasonic transducer, a first analog-digital converter for converting the echo signals amplified by the first receiver to digital echo signals, a second analog-digital converter for converting the echo signal amplified by the second receiver to digital echo signals, a first memory for memorizing the digital echo signals converted by the first analog-digital converter, a second memory for memorizing the digital echo signals converted by the second analog-digital converter, a flasher display in which the first and second luminous elements mounted on a rotary disc rotated in a constant speed by a motor are opposite to a circular window of a picture disc, and a control device for reading the digital echo signals from the first and second memories, for applying to the first and second luminous elements and for applying the next trigger signals to the first and second oscillators, whereby the first and second luminous elements fixed on the same place of the rotary disc are luminous as one picture.

DESCRIPTION OF THE PREFERRED EMBODIMENTS

Figure 1:
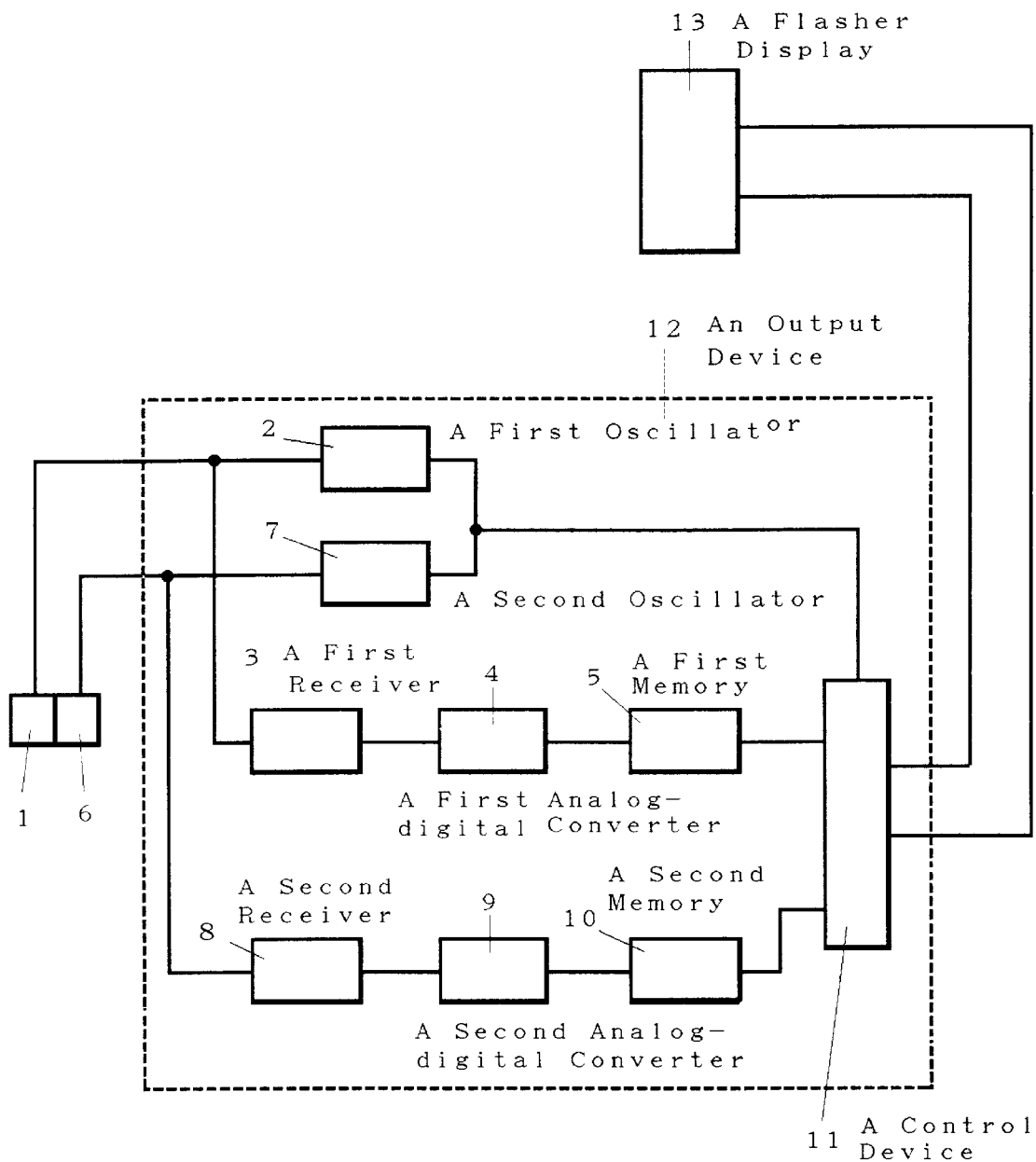
FIG. 1 shows a block diagram of a flasher type fish sonar of the present invention.

Referring to FIG. 1, a narrow directive ultrasonic transducer 1 is connected to an output terminal of a first oscillator 2 and an input terminal of a first receiver 3, the output terminal of the first receiver 3 is connected to an input terminal of a first analog-digital converter 4, and the output terminal of the first analog-digital converter 4 is connected to an input terminal of a first memory 5. A wide directive ultrasonic transducer 6 which is fixed to the narrow ultrasonic transducer 1 in unity is connected to an output of a second oscillator 7 and an input terminal of a second receiver 8, the output of the receiver 8 is connected to an input terminal of a second analog-digital converter 9, the output terminal of the second analog-digital converter 9 is connected to an input terminal of a second memory 10, and the output terminals of the first and second memories 5 and 10 are connected to a control device 11. An output device 12 is constructed by the first and second oscillators 2 and 7, the first and second receivers 6 and 8, the first and second digital-analog converters 4 and 9, the first and second memories 5 and 10 and the control device 11 and the output terminals of the control device 11 in the output device 12 are connected to a flasher display 13.

Figure 2:
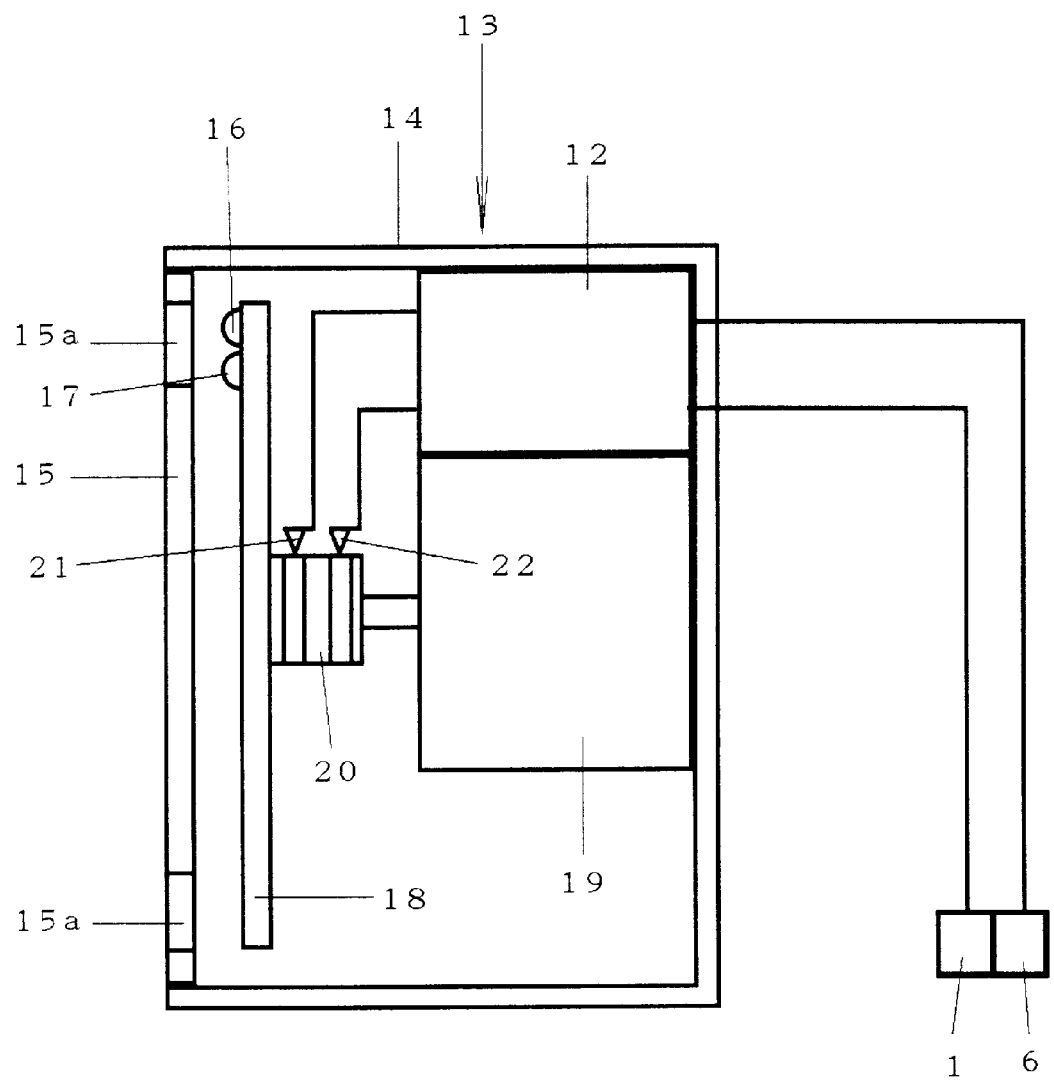
FIG. 2 shows a side view of a flasher display of FIG. 1.
Figure 3:
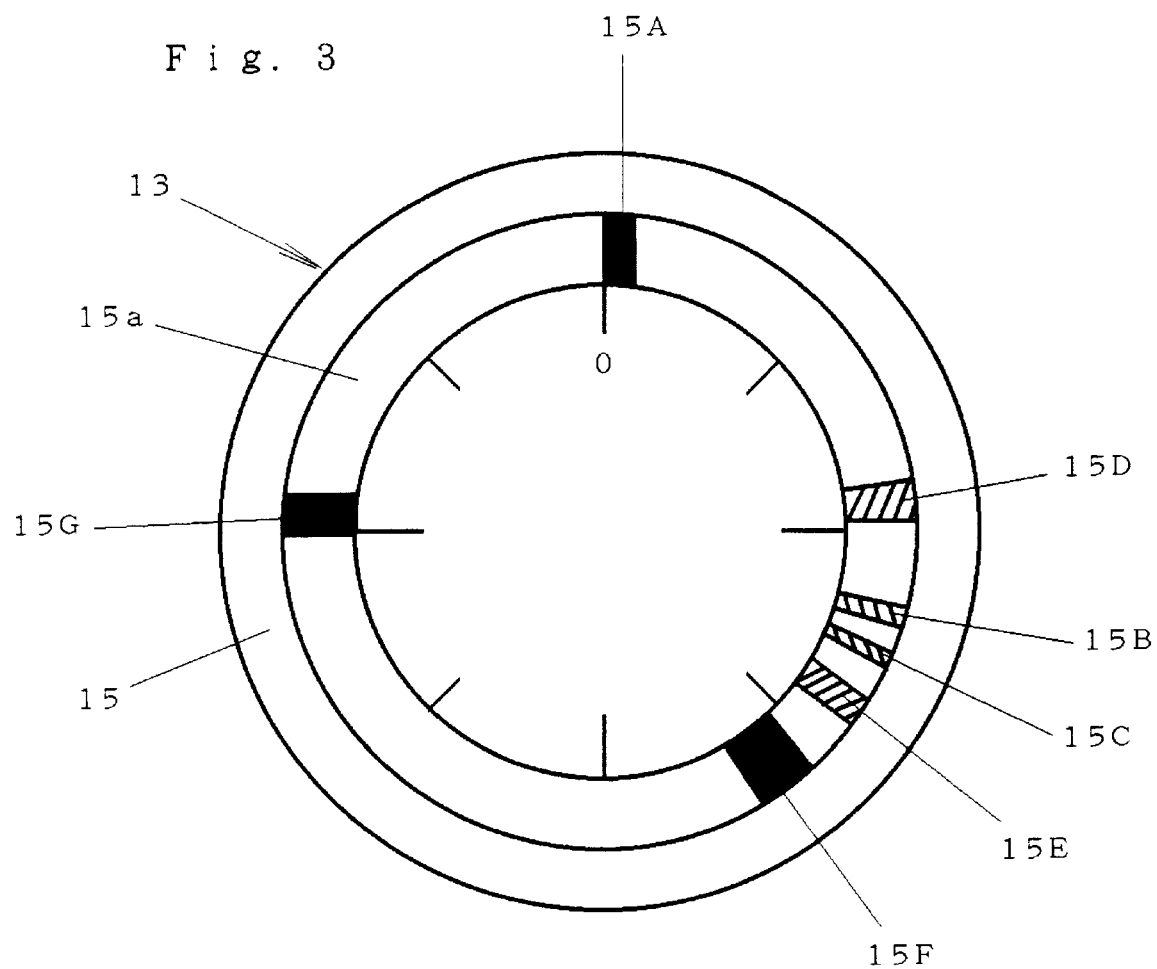
FIG. 3 shows a front view of a flasher display of FIG. 1.

Referring to FIGS. 2 and 3, in the flasher display 13, a display disc 15 is attached to the front of the case 14, a transparent circular window 15a is formed in the display disc 15, and first and second luminous elements 16 and 17 attached to a rotary disc 18 which is rotated by a motor 19 are opposite to the circular window 15a. Two slip rings 20 are mounted on the rotary shaft of the motor 19 and brushes 21 and 22 are in contact with the slip rings 20. Then display signals from the control device 11 in the output device 12 are applied to the brushes 21 and 22 and are applied to the luminous elements 17 and 16 through the slip rings 20 and lead lines attached to the rotary disc 18.

Figure 4:
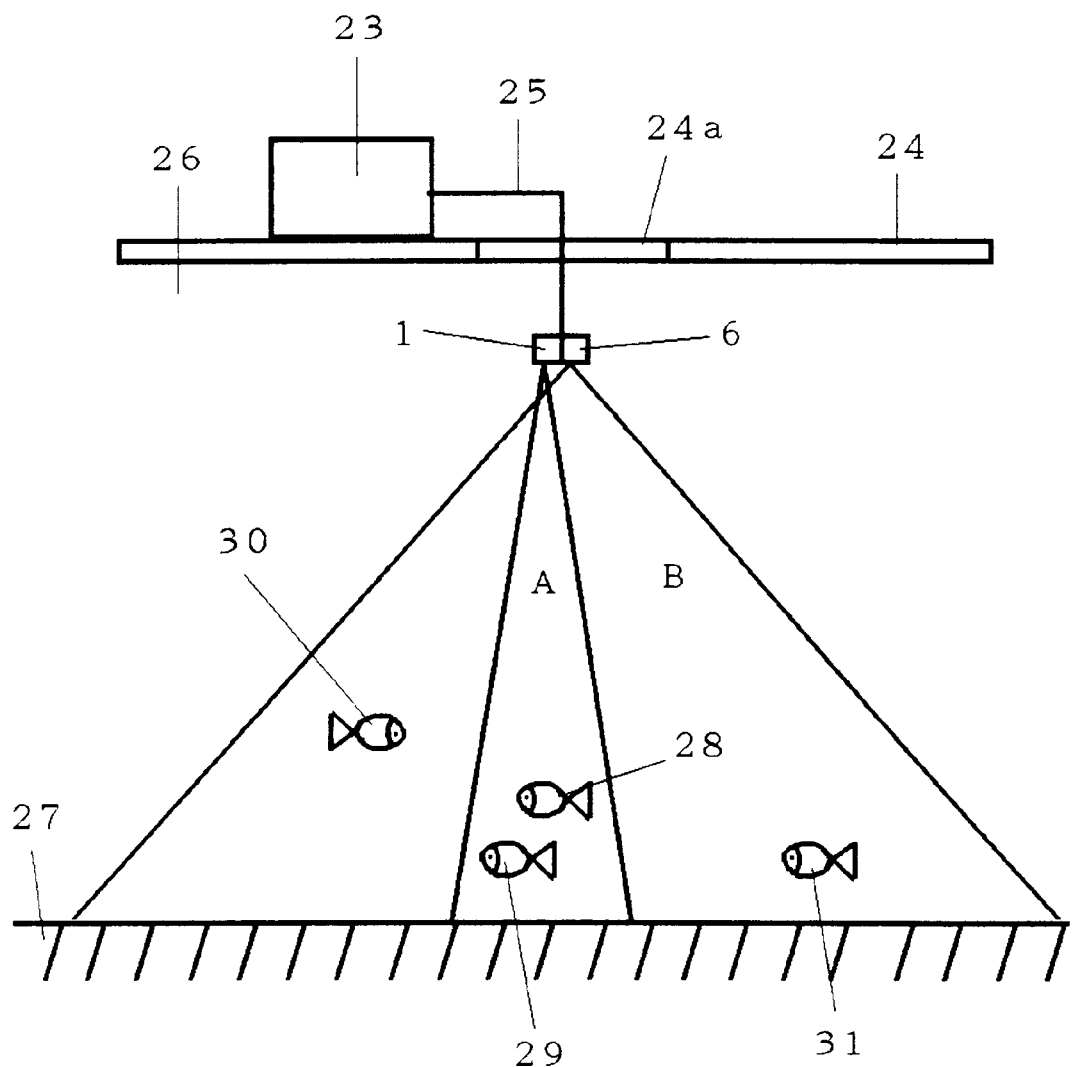
FIG. 4 shows a explicative view of flasher type fish sonar of FIG. 1.

Explaining the operation of the present invention by referring to FIG. 4, the flasher type fish sonar of the present invention is put on ice 24 in a pond, the first and second ultrasonic transducers 1 and 6 are put into the water 26 through a hole 24a of the ice 24 by a cable 25, and fishes 28, 29, 30 and 31 swim near to the bottom 27 in the pond. When trigger signals are applied to the first and second oscillators 2 and 7 at the same time from the control device 11 in the flasher type fish sonar 23, the ultrasonic wave A having a narrow directive angle from the narrow ultrasonic transducer 1 is transmitted to the water in the pond and the ultrasonic wave B having a wide directive angle from the second ultrasonic transducer 6 is transmitted to the water of the pond in the same time.

Therefore, as shown in FIG. 3, a base line 15A is displayed at the position "0" on the circular transparent window 15a of the display disc 15 in the flasher display 13, the echo signals to the fishes 28 and 29 in the ultrasonic wave having the narrow directive angle as shown in FIG. 4 are displayed by the display lines 15B and 15C on the display disc 15 of the flasher display 13 in FIG. 3, the echo signals to the fishes 30 and 31 in the ultrasonic wave B having the wide directive angle are displayed by the display lines 15D and 15E on the display disc 15 of the flasher display 13, the first echo signal to the bottom 27 in the water is displayed by the display line 15F on the display disc 15 of the flasher display 13, and the second echo signal is displayed by the display line 15G on the display disc 15 of the flasher display 13.

In the present invention, because the condition in the water is detected by the ultrasonic wave having the narrow directive angle from the narrow ultrasonic transducer 1 and the ultrasonic wave having the wide directive angle from the wide ultrasonic transducer 6, it is seen that fishes are in the area of the ultrasonic wave having the narrow directive angle and are not in the area of the ultrasonic wave having the wide directive angle. Therefore, fishermen get good information of the fishes, because the distribution and motion of the fishes in the bottom and the motion of fishes between the ultrasonic waves of the narrow and wide directive angles can be seen by the flasher type fish sonar of the present invention.

In the above embodiment, when red and green luminescent semiconductor diodes are used as luminous elements 16 and 17, the display lines 15B and 15C to the ultrasonic wavee A having the narrow directive angle are clearly distinguished from the display lines 15C and 15D to the ultrasonic wave B having the wide directive angle. Also, other luminous diodes can be used when luminous elements 16 and 17 are distinguished from each other.

What is claimed is:

1. A flasher type fish sonar comprising a narrow directive ultrasonic transducer for generating ultrasonic pulse waves having a narrow directive angle, a wide directive ultrasonic transducer for generating ultrasonic pulse waves having a wide directive angle, a first oscillator for applying oscillating signals to the narrow directive ultrasonic transducer, a second oscillator for applying oscillating signals to the wide directive ultrasonic transducer, a first receiver for amplifying echo signals from the narrow directive ultrasonic transducer, a second receiver for amplifying echo signals from the wide directive ultrasonic transducer, a first analog-digital converter for converting the echo signals amplified by the first receiver to digital echo signals, a second analog-digital converter for converting the echo signal amplified by the second receiver to digital echo signals, a first memory for memorizing the digital echo signals converted by the first analog-digital converter, a second memory for memorizing the digital echo signals converted by the second analog-digital converter, a flasher display in which first and second luminous elements mounted on a rotary disc rotated in a constant speed by a motor are opposite to a circular window of a picture disc, and a control device for reading the digital echo signals from the first and second memories, for applying display signals to the first and second luminous elements and for applying the trigger signals to the first and second oscillators, whereby the first and second luminous elements fixed on the same place of the rotary disc are luminous as one picture.

2. A flasher type fish sonar as set forth claim 1 wherein the first luminous element is a green luminescent semiconductor diode and the second luminous element is a red luminescent semiconductor diode.

\* \* \* \* \*